United States Patent
Yamauchi

(10) Patent No.: US 10,983,703 B2
(45) Date of Patent: Apr. 20, 2021

(54) BANDWIDTH CONTROL DEVICE, BANDWIDTH CONTROL METHOD, AND COMPUTER-READABLE MEDIUM

(71) Applicant: FUJITSU LIMITED, Kawasaki (JP)

(72) Inventor: Takahiro Yamauchi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 16/525,674

(22) Filed: Jul. 30, 2019

(65) Prior Publication Data

US 2020/0073557 A1 Mar. 5, 2020

(30) Foreign Application Priority Data

Aug. 30, 2018 (JP) .............................. JP2018-161658

(51) Int. Cl.
| | | |
|---|---|---|
| *G06F 12/00* | (2006.01) | |
| *G06F 3/06* | (2006.01) | |
| *G06F 13/00* | (2006.01) | |
| *G06F 13/28* | (2006.01) | |

(52) U.S. Cl.
CPC .......... *G06F 3/0613* (2013.01); *G06F 3/0646* (2013.01); *G06F 3/0653* (2013.01); *G06F 3/0685* (2013.01)

(58) Field of Classification Search
CPC .... G06F 3/0613; G06F 3/0646; G06F 3/0653; G06F 3/0685
See application file for complete search history.

(56) References Cited

U.S. PATENT DOCUMENTS

| | | | | |
|---|---|---|---|---|
| 7,428,624 | B2 * | 9/2008 | Fujita | G06F 3/0613 709/213 |
| 8,578,045 | B2 * | 11/2013 | Bowra | H04L 65/4092 709/232 |
| 2013/0215767 | A1 * | 8/2013 | Bryant | H04L 43/087 370/252 |
| 2015/0277767 | A1 | 10/2015 | Hamano et al. | |
| 2015/0326481 | A1 * | 11/2015 | Rector | H04L 12/6418 370/236 |
| 2016/0170650 | A1 * | 6/2016 | Yamauchi | G06F 3/0653 711/154 |

FOREIGN PATENT DOCUMENTS

| | | |
|---|---|---|
| JP | 2015-191628 | 11/2015 |
| JP | 2016-115130 | 6/2016 |

* cited by examiner

*Primary Examiner* — Mark A Giardino, Jr.
(74) *Attorney, Agent, or Firm* — Fujitsu Patent Center

(57) ABSTRACT

A storage management device includes one or more memories including a plurality of storage regions associated with target values of performance of data transmission, and one or more processors coupled to the one or more memories and the one or more processors configured to acquire, for each of the plurality of storage regions, a measured value of performance of data transmission, perform, when a first measured value for a first storage region in the plurality of storage regions does not satisfy a first target value associated with the first storage region, selection of a second storage region from selection candidates including one or more storage regions determined from the plurality of storage regions based on differences between each of the target values and each the measured value, and reduce a bandwidth allocated to the selected second storage region.

11 Claims, 9 Drawing Sheets

| VOLUME IDENTIFICATION INFORMATION | GUARANTEED PERFORMANCE | TYPE | BANDWIDTH |
|---|---|---|---|
| Storage=1, VolNo=1 | 10 | GUARANTEED | 10MB/s, 100IOPS |
| Storage=1, VolNo=2 | - | SACRIFICED | 20MB/s, 200IOPS |
| Storage=2, VolNo=1 | 20 | GUARANTEED | 15MB/s, 150IOPS |
| Storage=1, VolNo=2 | 10 | SACRIFICED | 100MB/s, 500IOPS |

| PERFORMANCE MEASUREMENT DATE AND TIME | VOLUME IDENTIFICATION INFORMATION | MEASURED RESPONSE TIME | MEASURED THROUGHPUT | MEASURED IOPS | MEASURED CACHE HIT RATIO | MEASURED DELAY TIME |
|---|---|---|---|---|---|---|
| 20110101000000-20110101000030 | Storage=1, VolNo=1 | 10ms | 12MB/s | 100IOPS | 10% | 0ms |
| 20110101000000-20110101000030 | Storage=1, VolNo=2 | 11ms | 9MB/s | 100IOPS | 9% | 1ms |
| 20110101000000-20110101000030 | Storage=2, VolNo=1 | 12ms | 8MB/s | 100IOPS | 8% | 2ms |
| 20110101000000-20110101000030 | Storage=2, VolNo=2 | 13ms | 7MB/s | 100IOPS | 7% | 3ms |
| 20110101000030-20110101000100 | Storage=1, VolNo=1 | 11ms | 11MB/s | 110IOPS | 10% | 0ms |
| 20110101000030-20110101000100 | Storage=1, VolNo=2 | 12ms | 10MB/s | 120IOPS | 9% | 1ms |
| 20110101000030-20110101000100 | Storage=2, VolNo=1 | 13ms | 9MB/s | 130IOPS | 8% | 2ms |
| 20110101000030-20110101000100 | Storage=2, VolNo=2 | 14ms | 8MB/s | 140IOPS | 7% | 3ms |

| PERFORMANCE MEASUREMENT DATE AND TIME | RESOURCE TYPE | RESOURCE IDENTIFICATION INFORMATION | BUSY RATE |
|---|---|---|---|
| 20110101000000-20110101000030 | CPU | Storage=1, CM#0 | 10% |
| 20110101000000-20110101000030 | FC SWITCH | Switch=1, Port#0 | 11% |
| 20110101000000-20110101000030 | RAID GROUP | Storage=1, RAIDG#1 | 12% |
| 20110101000030-20110101000100 | CPU | Storage=1, CM#0 | 11% |
| 20110101000030-20110101000100 | FC SWITCH | Switch=1, Port#0 | 12% |
| 20110101000030-20110101000100 | RAID GROUP | Storage=1, RAIDG#1 | 13% |

| VOLUME IDENTIFICATION INFORMATION | PERFORMANCE DEFICIENCY VALUE (%) |
|---|---|
| Storage=1, VolNo=2 | 10 |
| Storage=1, VolNo=3 | 20 |
| ... | ... |

BANDWIDTH CONTROL DEVICE, BANDWIDTH CONTROL METHOD, AND COMPUTER-READABLE MEDIUM

CROSS-REFERENCE TO RELATED APPLICATION

This application is based upon and claims the benefit of priority of the prior Japanese Patent Application No. 2018-161658, filed on Aug. 30, 2018, the entire contents of which are incorporated herein by reference.

FIELD

The embodiments relate to a storage management technique.

BACKGROUND

In recent years, the virtualization of open systems and servers has been widely used and system management has gotten more complex. To facilitate the system management and flexibly handle rapidly increasing data capacities, storage systems have been normally introduced.

In a storage system, disks of different speeds may be used. For example, the disks are solid state disks (SSDs), serial attached small computer system interface hard disk drives (SASHDDs), serial advanced technology attachment (SATA) HDDs, or the like.

In the storage system, a single storage region that is called a volume may be generated using disks that exist in the storage system and are of different speeds and of multiple types. In addition, an automatic storage layering technique is spreading, which determines storage locations of data in disks of different speeds within a single volume based on usage frequencies.

When the technique for automatically layering storage is used, data that is used with a high frequency is stored in a high-speed disk within a volume, and data that is used with a low frequency is stored in a low-speed disk within the volume, for example. By automatically layering storage, a high-speed large-capacity storage device may be enabled at low cost.

As a technique for adjusting the performance of storage, a bandwidth of a data transfer path between a volume and a server that executes an application is adjusted, for example. This function is referred to as Quality of Service (QoS) in some cases.

As a technique for adjusting a bandwidth using QoS, there is a related technique for setting target values of performance in volumes and determining allocation rates of bandwidths to the volumes so that the performance reaches the target values.

In addition, there is a related technique for setting a guaranteed volume that guarantees a target value of performance and a sacrificed volume for which a bandwidth is reduced to cause the performance of the guaranteed volume to reach the target value. Sacrificed volumes may include volumes of two types, a target setting volume for which a target value is set and a non-target setting volume for which a target value is not set. As a standard for guaranteeing performance, response time, throughput, or input output per second (IOPS) is normally used.

In the bandwidth adjustment using a guaranteed volume and a sacrificed volume, when a bandwidth of a selected target setting volume is adjusted in order to cause performance of the target setting volume to reach a target value of the target setting volume, but the performance of the target setting volume does not reach the target value, a bandwidth may be allocated to the guaranteed volume and the performance may not reach the target value.

Related techniques are disclosed in, for example, Japanese Laid-open Patent Publication No. 2015-191628 and Japanese Laid-open Patent Publication No. 2016-115130.

SUMMARY

According to an aspect of the embodiments, a storage management device includes one or more memories including a plurality of storage regions associated with target values of performance of data transmission, and one or more processors coupled to the one or more memories and the one or more processors configured to acquire, for each of the plurality of storage regions, a measured value of performance of data transmission, perform, when a first measured value for a first storage region in the plurality of storage regions does not satisfy a first target value associated with the first storage region, selection of a second storage region from selection candidates including one or more storage regions determined from the plurality of storage regions based on differences between each of the target values and each the measured value, and reduce a bandwidth allocated to the selected second storage region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a QoS setting table;

FIG. 5 is a diagram illustrating an example of a volume performance information file;

FIG. 6 is a diagram illustrating an example of a resource performance information file;

FIG. 7 is a diagram illustrating an example of a performance deficiency value table.

DESCRIPTION OF EMBODIMENTS

A related method for selecting sacrificed target setting volumes, however, is simple and is to select the volumes in order or the like. In this method, even target setting volume's performance that may reach a target value when appropriate selection is executed may not reach the target value. As described above, in the related method for selecting target setting volumes, it is difficult to effectively use resources. When the resources are not effectively used, the performance of an entire system may be reduced.

Hereinafter, embodiments of a storage management device disclosed herein, a storage management method disclosed herein, and a storage management program disclosed herein are described in detail with reference to the accompanying drawings. The storage management device disclosed herein, the storage management method disclosed herein, and the storage management program disclosed herein, however, are not limited by the following embodiments.

Figure 1:
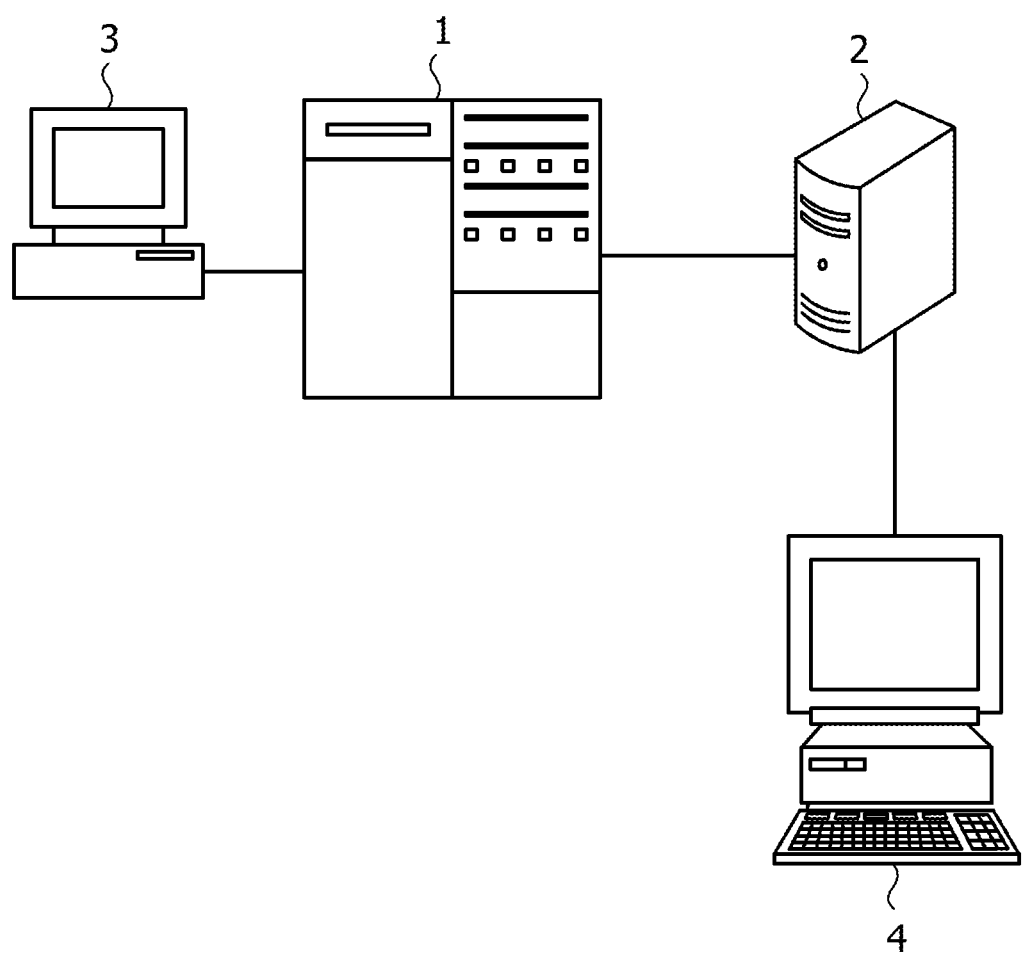
FIG. 1 is a schematic configuration diagram of a storage system.

FIG. 1 is a schematic configuration diagram of a storage system. As illustrated in FIG. 1, the storage system according to a first embodiment includes an operation managing server 1, a storage device 2, an operation terminal 3, and a business server 4. FIG. 1 illustrates the single storage device 2. The number of storage devices 2, however, is not limited. FIG. 1 also illustrates the single business server 4. The number of business servers 4, however, is not limited.

The operation terminal 3 is connected to the operation managing server 1 via a network. The operation terminal 3 transmits an instruction to execute a process on the storage device 2 and the like to the operation managing server 1. In addition, the operation terminal 3 displays, on a monitor, a message transmitted by the operation managing server 1 and the like to notify the message and the like to an operator. Furthermore, the operation terminal 3 displays a screen for entering guaranteed response time described later on a display device such as the monitor.

The operation managing server 1 operates and manages the storage device 2. The operation managing server 1 executes a QoS control program including multiple commands and a storage management program including multiple commands.

For example, the operation managing server 1 controls QoS for the storage device 2 and the like. The QoS is a performance setting function of maintaining stable performance of the storage device 2. The QoS adjusts a bandwidth allocated to a volume described later and the like. In addition, the operation managing server 1 controls the storage device 2 in accordance with a command input from the operation terminal 3. For example, the operation managing server 1 instructs the storage device 2 to configure a RAID in accordance with information indicating the RAID and input from the operation terminal 3. The operation managing server 1 is an example of a "storage management device".

The storage device 2 receives an instruction from an application executed in the business server 4 and applies the QoS to read and write data. In addition, the storage device 2 receives an instruction to adjust a bandwidth allocated to a volume or the like from the operation managing server 1 and controls the QoS.

The business server 4 executes a business application. To execute the application, the business server 4 reads and writes data from and to the storage device 2. The application to be executed by the business server 4 is not limited as long as the application transmits and receives data to and from the storage device 2.

Figure 2:
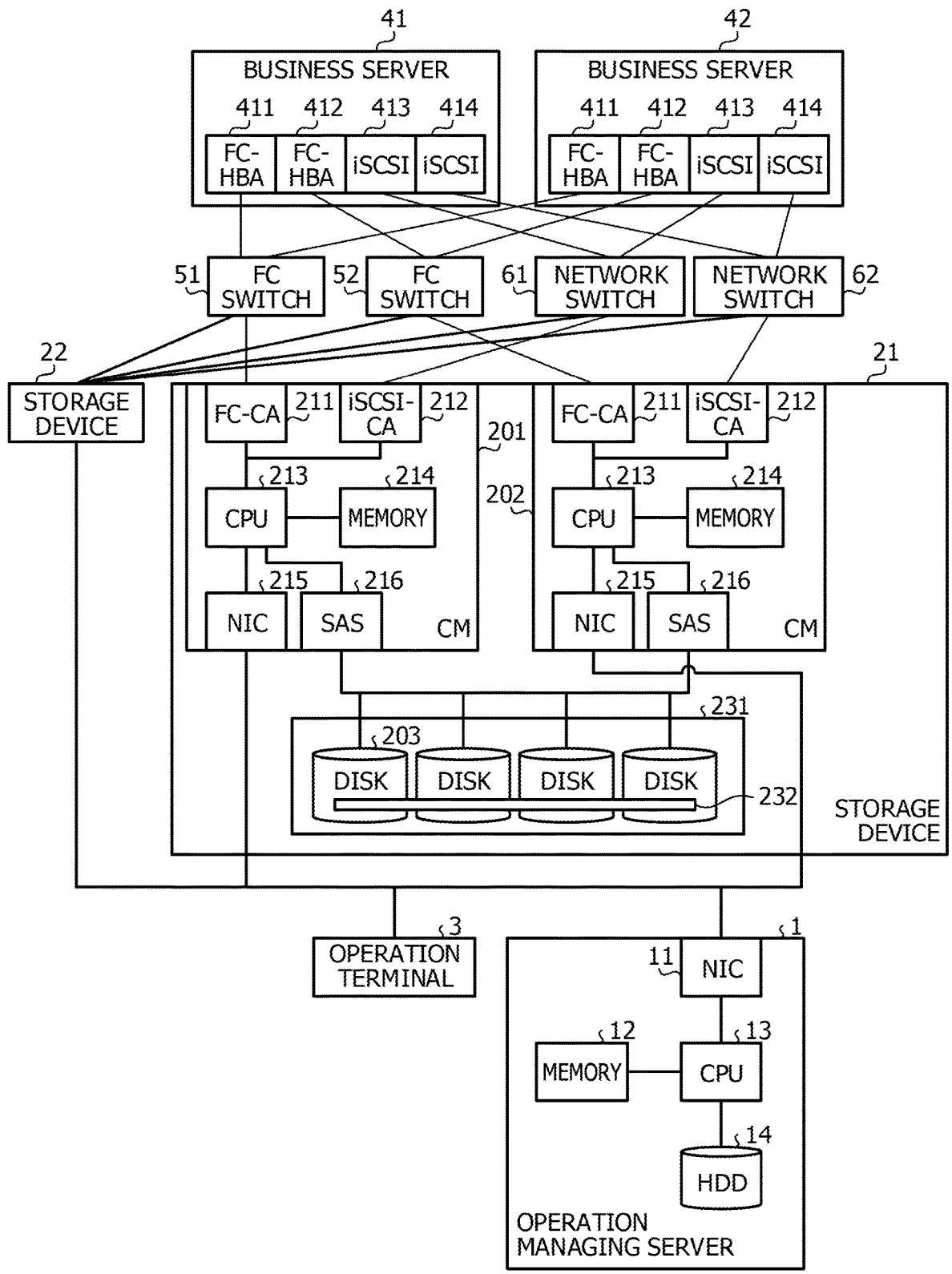
FIG. 2 is a hardware configuration diagram of the storage system.

FIG. 2 is a hardware configuration diagram of the storage system. FIG. 2 illustrates a state in which each of storage devices 21 and 22 is installed as the storage device 2. FIG. 2 also illustrates a state in which each of business servers 41 and 42 is installed as the business server 4.

Each of the business servers 4 includes fiber channel-host bus adapters (FC-HBAs) 411 and 412 and Internet small computer system interfaces (iSCSIs) 413 and 414. The first embodiment describes two FC-HBAs 411 and 412 installed in each of the business servers 4. The number of FC-HBAs installed in each of the business servers 4 is arbitrary. The first embodiment also describes two iSCSIs 413 and 414 installed in each of the business servers 4. The number of iSCSIs installed in each of the business servers 4 is arbitrary.

The FC-HBAs 411 and 412 are communication interfaces for data communication using fiber channels. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication using fiber channels between the storage devices 2 and the business servers 4. The FC switches 51 and 52 connect the FC-HBAs 411 and 412 to FC channel adapters (FC-CAs) 211.

The network switches 61 and 62 relay communication using the iSCSIs between the storage devices 2 and the business servers 4. The network switches 61 and 62 connect the iSCSIs 413 and 414 to iSCSI-CAs 212.

Each of the storage devices 2 includes controller modules (CMs) 201 and 202 and disks 203.

The CMs 201 and 202 have the same mechanism. Thus, the CM 201 is described below as an example. The CM 201 includes an FC-CA 211, an iSCSI-CA 212, a central processing unit (CPU) 213, a memory 214, a network interface card (NIC) 215, and a serial attached SCSI (SAS) 216.

The FA-CA 211, the iSCSI-CA 212, the memory 214, the NIC 215, and the SAS 216 are connected to the CPU 213.

The CPU 213 transmits and receives data to and from the business servers 4 via the FC-CA 211 and the iSCSI-CA 212. The CPU 213 reads and writes data from and to the disks 203 via the SAS 216.

The CPU 213 communicates with the operation terminal 3 and the operation managing server 1 via the NIC 215. For example, when the CPU 213 receives, from the operation managing server 1, an instruction to adjust a bandwidth described later, the CPU 213 adjusts the bandwidth allocated to a volume 232 in accordance with the instruction.

Multiple disks 203 are installed in each of the storage devices 2. FIG. 2 illustrates a state in which a RAID group 231 is formed by the multiple disks 203. The RAID group 231 includes the multiple volumes 232. The volumes 232 are logical volumes. The volumes, however, are not limited to the first embodiment. The RAID group 231 may not be formed.

Data writing by the CPU 213 and data reading by the CPU 213 are described below. The CPU 213 receives, from a business application executed in one or both of the business servers 4, a read command to read data and a write command to write data. In this case, the read command and the write command are transmitted to the CPU 213 via, for example, a port of the FC switch 51 and a port of the FC-CA 211. Then, the CPU 213 reads and writes the data from and to one or more of the disks 203 of the volumes 232 in accordance with the received commands. In this case, the data is written and read to and from the volume 232 in accordance with a configuration of the RAID group 231. Although the case where the processes of reading and writing data are executed by the CPU 213 of the CM 201 is described above, the same processes are executed by a CPU 213 of the CM 202.

For example, in data transfer including data writing and data reading, conflicts may arise between ports of the FC switch 51, between ports of the FC-CAs 211, between ports of the iSCSI-CAs 212, between the CPUs 213 serving as processors for processing data, and between volumes 232.

When a conflict arises between resources in the data transfer, the performance of the data transfer may be reduced. Regarding a transfer path using resources between which a conflict arises, the conflict between the resources is solved and the performance of data transfer is maintained at a high level by adjusting a bandwidth allocated to a volume 232 that is among the volumes 232 and uses the transfer path. The adjustment of a bandwidth allocated to a volume 232 among the volumes 232 is described below. The following describes the case where the business server 4 is connected to the storage device 2 via the FC switch 51. The following also describes the case where the volumes 232 are treated as units of the bandwidth adjustment. The units of the bandwidth adjustment, however, are not limited to this. For example, the RAID group 231 or the entire storage device 2 may be treated as a unit of the bandwidth adjustment.

The operation managing server 1 includes an NIC 11, a memory 12, a CPU 13, and a hard disk drive (HDD) 14. The CPU 13 uses the memory 12 to execute various programs stored in the HDD 14. The CPU 13 communicates with the CMs 201 and 202 of the storage device 2 via the NIC 11.

Figure 3:
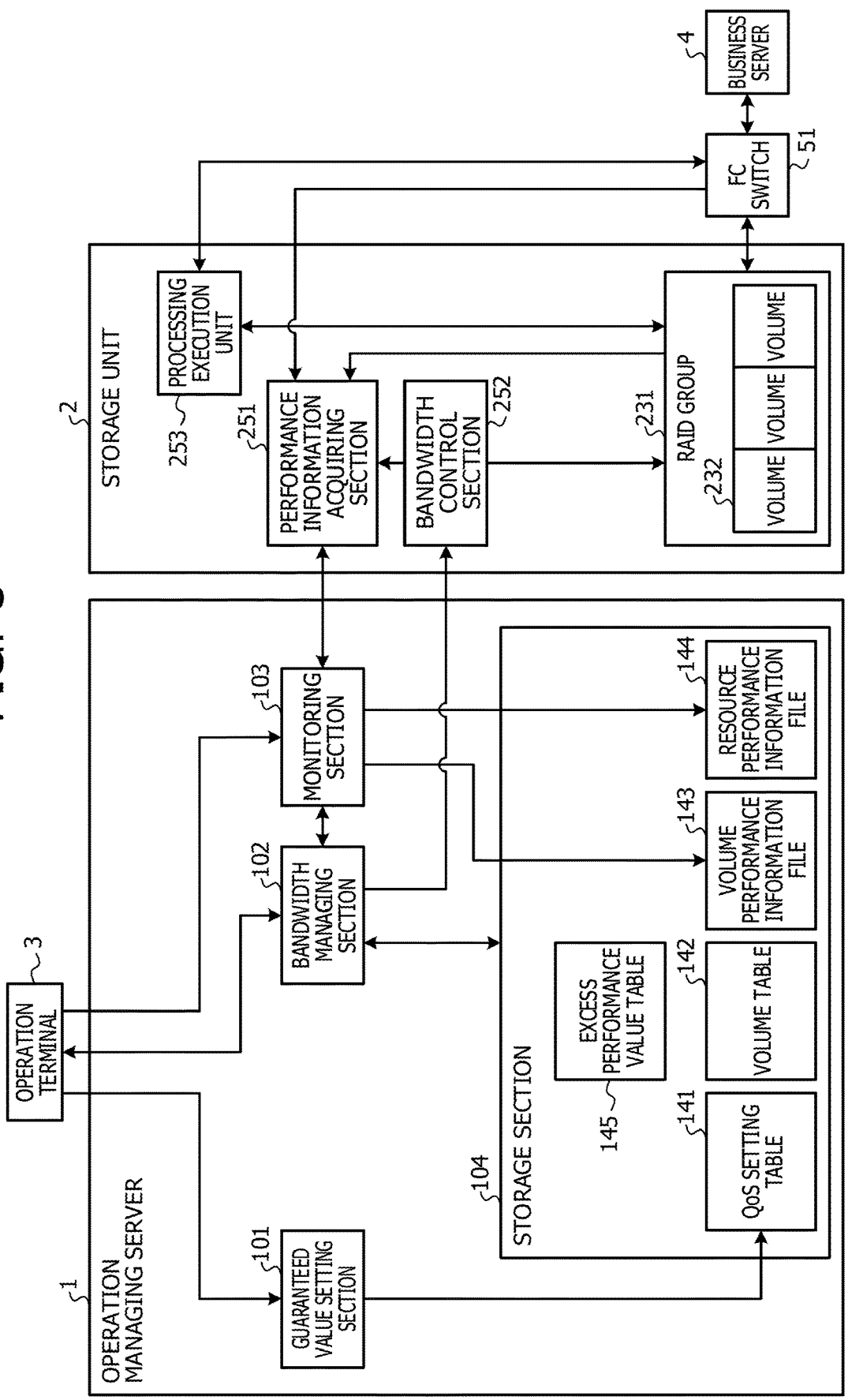
FIG. 3 is a block diagram of an operation managing server and a storage device.

FIG. 3 is a block diagram of the operation managing server and the storage device. The operation managing server 1 includes a guaranteed value setting section 101, a bandwidth managing section 102, a monitoring section 103, and a storage section 104. The storage device 2 includes a performance information acquiring section 251, a bandwidth control section 252, and a processing executing section 253.

The storage section 104 includes predetermined information storage regions for storing a QoS setting table 141, a volume table 142, a volume performance information file 143, a resource performance information file 144, and a performance deficiency value table 145. The information storage regions may not store the tables and may store information to be used to generate the tables upon control. Functions of the storage section 104 may be implemented by, for example, the HDD 14 illustrated in FIG. 2.

FIG. 4 is a diagram illustrating an example of the QoS setting table. In the first embodiment, in the QoS setting table 141, volume identification information, a target value or guaranteed performance, a type, and a bandwidth are registered in association with each other.

The volume identification information is information for uniquely identifying each of the volumes 232. In the first embodiment, the volume identification information is expressed by a number assigned to the storage device 2 and a number assigned to the volume 232. For example, when the storage device 21 illustrated in FIG. 2 is indicated by a number 1 and the storage device 22 illustrated in FIG. 2 is indicated by a number 2, "Storage=1, VolNo=1" indicates a volume 232 that is among the volumes 232 included in the storage device 21 and has a volume number 1.

In addition, the guaranteed performance or the target value indicates response time guaranteed or a target value set for the volume 232 having the associated volume identification information. The guaranteed response time indicates response time guaranteed on a priority basis. The target value has a lower priority than the guaranteed response time and indicates a value adjusted so that the response time reaches the target value as much as possible.

The type indicates whether the volume 232 having the associated volume identification information is the volume 232 for which response time is guaranteed or the volume 232 for which response time is not guaranteed. The type further indicates whether the volume 232 for which response time is not guaranteed is the volume 232 for which the target value is set or the volume 232 for which the target value is not set. Hereinafter, a volume 232 for which response time is guaranteed is referred to as "guaranteed volume". Hereinafter, a volume 232 for which response time is not guaranteed is referred to as "sacrificed volume". In addition, a volume 232 that is a sacrificed volume and for which a target value is set is referred to as "target setting volume". A volume 232 that is a sacrificed volume and for which a target value is not set is referred to as "non-target setting volume".

The bandwidth indicates a bandwidth set for the volume 232 having the associated volume identification information. In FIG. 4, each of the bandwidths is expressed by two types, a data amount (MB per second) per second that indicates throughput and the number (IOPS) of times that reading and writing are executed.

The volume table 142 indicates resources to be used by each of the volumes 232. For example, each of the volumes 232 indicated by the volume identification information uses a processor, a port number, a switch port, and a RAID group that are associated with each other in the volume table 142.

FIG. 5 is a diagram illustrating an example of the volume performance information file. In the volume performance information file 143, information that indicates measured performance of each of the volumes 232 is registered. In the first embodiment, in the volume performance information file 143, a performance measurement date and time when performance is measured, volume identification information, measured response time, measured throughput, measured IOPS, a measured cache hit ratio, and measured delay time are registered in association with each other. Hereinafter, the volume identification information, the measured response time, the measured throughput, the measured IOPS, the measured cache hit ratio, and the measured delay time are collectively referred to as "performance information of the volume" in some cases.

The measured response time is response time measured when data is read and written from and to the volume 232 having the associated volume identification information. The measured throughput is throughput measured when the data is read and written from and to the volume 232 having the associated volume identification information. The measured IOPS is IOPS measured when the data is read and written from and to the volume 232 having the associated volume identification information. The measured cache hit ratio is a cache hit ratio measured when the data is read and written from and to the volume 232 having the associated volume identification information. The measured delay time is delay time measured when the data is read and written from and to the volume 232 having the associated volume identification information.

FIG. 6 is a diagram illustrating an example of the resource performance information file. The resource performance information file 144 indicates actual performance of each resource. In the first embodiment, in the resource performance information file 144, a performance measurement date and time when performance is measured, a resource type, resource identification information, and a busy rate are registered in association with each other.

The resource identification information is information for uniquely identifying each of the resources. The resource type is information indicating the type of the resource identified by the resource identification information. The busy rate is a load factor of the resource identified by the resource identification information.

FIG. 7 is a diagram illustrating an example of the performance deficiency value table. The performance deficiency value table 145 indicates a performance deficiency value of each of the resources. The performance deficiency value indicates excess of a measured value of response time of a selected target setting volume at this time point over a target value or indicates a percentage of the measured value of the response time with respect to the target value. For example, the performance deficiency value is calculated by dividing the measured value of the response time by the target value, multiplying the result of the division by 100, and subtracting 100 from the result of the multiplication.

The performance deficiency value indicates that as the performance deficiency value increases, it is more difficult to adjust the performance of the target setting volume to the target value. The performance deficiency value is the ratio of the measured value to the target value. Thus, even when an index for evaluating the performance indicates response time, IOPS, or throughput, the index may be used as the same standard. Each of the performance deficiency values is an example of a "difference between a measured value of performance of data transmission and reception and a target value of the performance of the data transmission and reception". The performance deficiency value table 145 is an example of a "storage section". In the first embodiment, in the performance deficiency value table 145, each of the performance deficiency values and the volume identification information indicating each of the volumes 232 are registered in association with each other.

An operator uses an input device such as a mouse to select the types of the volumes or select whether to set each of the volumes 232 to a guaranteed volume or a sacrificed volume and select whether to set each of sacrificed volumes to a target setting volume or a non-target setting volume. The operator also uses an input device such as a keyboard to enter target performance. For example, the operator enters guaranteed response time for a guaranteed volume and enters a target value for a sacrificed volume. The operation terminal 3 transmits each of the types, entered by the operator, of the volumes and the target performance entered by the operator to the guaranteed value setting section 101.

The guaranteed value setting section 101 receives each of the types of the volumes and the target performance from the operation terminal 3. Then, the guaranteed value setting section 101 registers the received types of the volumes and the received target performance of the volumes in the QoS setting table 141, as illustrated in FIG. 3.

The monitoring section 103 receives, from the operation terminal 3, an instruction, entered by the operator, to start to collect performance information. After that, the monitoring section 103 starts periodically receiving, from the performance information acquiring section 251, performance information of the volumes 232 and the resources. Then, the monitoring section 103 writes the received performance information of the volumes 232 to the volume performance information file 143. The monitoring section 103 writes the received performance information of the resources to the resource performance information file 144.

The monitoring section 103 receives, from the bandwidth managing section 102, an instruction to collect performance information of a specific volume 232. Then, the monitoring section 103 acquires, from the performance information acquiring section 251, the performance information of the specified specific volume 232. After that, the monitoring section 103 outputs the acquired performance information of the specific volume 232 to the bandwidth managing section 102.

The bandwidth managing section 102 identifies guaranteed volumes from the QoS setting table 141. Then, the bandwidth managing section 102 selects one of the guaranteed volumes. This selection of the guaranteed volume is hereinafter referred to as "first selection". Then, the bandwidth managing section 102 acquires, from the volume table 142, information of resources to be used by the guaranteed volume selected in the first selection. The bandwidth managing section 102 acquires, from the resource performance information file 144, busy rates of the acquired resources. Then, the bandwidth managing section 102 identifies a resource with the highest busy rate from the resources to be used by the guaranteed volume selected in the first selection.

The bandwidth managing section 102 uses the volume table 142 to identify volumes 232 sharing the resource with the highest busy rate among busy rates of the resources to be used by the guaranteed volume selected in the first selection. The identified volumes 232 are referred to as "sharing volumes".

The bandwidth managing section 102 selects one guaranteed volume or one target setting volume from among the sharing volumes. This selection of the guaranteed volume or the target setting volume is hereinafter referred to as "second selection". The guaranteed volume selected in the second selection may be the guaranteed volume selected in the first selection.

Then, the bandwidth managing section 102 acquires, from the volume performance information file 143, measured response time of the volume 232 selected in the second selection.

When the volume 232 selected in the second selection is a guaranteed volume, the bandwidth managing section 102 acquires, from the QoS setting table 141, guaranteed response time of the guaranteed volume selected in the second selection. Then, the bandwidth managing section 102 acquires tentative target response time of the guaranteed volume selected in the second selection.

Then, the bandwidth managing section 102 compares the measured response time of the guaranteed volume selected in the second selection with the tentative target response time of the guaranteed volume selected in the second selection.

When the tentative target response time is shorter than the measured response time, the bandwidth managing section 102 schedules an increase in a bandwidth allocated to the guaranteed volume selected in the second selection. In addition, the bandwidth managing section 102 schedules a reduction in a bandwidth allocated to a non-target setting volume among the sharing volumes. Then, the bandwidth managing section 102 sets a sacrifice flag for a target setting volume among the sharing volumes to ON. Then, the bandwidth managing section 102 schedules a reduction in a bandwidth allocated to the target setting volume among the sharing volumes. Then, the bandwidth managing section 102 sets, as tentative target response time, the result of subtracting a difference between the guaranteed response time and the measured response time from the guaranteed response time for the guaranteed volume selected in the second selection.

When the tentative target response time is longer than the measured response time, the bandwidth managing section 102 schedules a reduction in the bandwidth allocated to the guaranteed volume selected in the second selection. In addition, the bandwidth managing section 102 schedules an increase in the bandwidth allocated to the non-target setting volume among the sharing volumes. Then, the bandwidth managing section 102 sets, as tentative target response time, the result of adding the difference between the guaranteed response time and the measured response time to the guaranteed response time for the guaranteed volume selected in the second selection.

When the volume 232 selected in the second selection is a target setting volume, the bandwidth managing section 102 requests the monitoring section 103 to measure a value of response time of the selected target setting volume at this time point. After that, the bandwidth managing section 102 acquires, from the monitoring section 103, the measured value of the response time of the selected target setting volume. This target setting volume is an example of a "storage region". Each of the response time, the IOPS, and the throughput is an example of "performance of data transmission and reception".

Then, the bandwidth managing section 102 acquires, from the QoS setting table 141, a target value of the selected target setting volume. Then, the bandwidth managing section 102 determines whether a sacrifice flag for the selected target setting volume indicates ON when the measured value of the response time of the selected target setting volume at the time point is equal to or larger than the target value. In the case where the sacrifice flag indicates ON, even when the target value is set, the sacrifice flag indicates the volume 232 for which adjustment that is to be executed to cause performance of the volume 232 to reach the target value is suppressed in order to cause performance of a guaranteed volume or another target setting volume to reach a target value. On the other hand, when the sacrifice flag indicates OFF, the sacrifice flag indicates the volume 232 for which the adjustment that is to be executed to cause the performance of the volume 232 to reach the target value is permitted in parallel with the achievement of a target of performance of a guaranteed volume or another target setting volume.

For example, the bandwidth managing section 102 holds information indicating whether each of sacrifice flags for target setting volumes indicates ON or OFF. In addition, the bandwidth managing section 102 uses the performance deficiency value table 145 to determine whether each of the sacrifice flags for the target setting volumes indicates ON or OFF. When a target setting volume registered in the performance deficiency value table 145 exists, the bandwidth managing section 102 may determine that a sacrifice flag for the target setting volume indicates OFF. On the other hand, for example, when a target setting volume registered in the performance deficiency value table 145 does not exist, the bandwidth managing section 102 may determine that a sacrifice flag for the target setting volume indicates ON.

When the sacrifice flag for the selected target setting volume indicates OFF, the bandwidth managing section 102 schedules an increase in the bandwidth allocated to the selected volume. After that, the bandwidth managing section 102 schedules a reduction in the bandwidth allocated to the non-target setting volume included in the sharing volumes. In addition, the bandwidth managing section 102 schedules an increase in a bandwidth allocated to the guaranteed volume selected in the first selection.

When the sacrifice flag for the selected target setting volume indicates ON, the bandwidth managing section 102 calculates a performance deficiency value of the selected target setting volume. Then, the bandwidth managing section 102 determines whether a target setting volume registered in the performance deficiency value table 145 exists. When the target setting volume registered in the performance deficiency value table 145 does not exist, the bandwidth managing section 102 schedules an increase in the bandwidth allocated to the selected volume. After that, the bandwidth managing section 102 schedules a reduction in the bandwidth allocated to the non-target setting volume included in the sharing volumes.

When the target setting volume registered in the performance deficiency value table 145 exists, the bandwidth managing section 102 identifies a target setting volume with the largest performance deficiency value among performance deficiency values registered in the performance deficiency value table 145. Then, the bandwidth managing section 102 compares a performance deficiency value of the selected target setting volume at the time point with the largest performance deficiency value among the performance deficiency values registered in the performance deficiency value table 145.

When the performance deficiency value of the selected target setting volume at the time point is equal to or larger than the largest performance deficiency value among the performance deficiency values registered in the performance deficiency value table 145, the bandwidth managing section 102 does not change the sacrifice flag, indicating ON, for the selected target setting volume. The selected target setting volume for which the sacrifice flag indicates ON is an example of a "volume to be excluded". After that, the bandwidth managing section 102 schedules a reduction in the bandwidth allocated to the non-target setting volume included in the sharing volumes.

When the performance deficiency value of the selected target setting volume at the time point is smaller than the largest performance deficiency value among the performance deficiency values registered in the performance deficiency value table 145, the bandwidth managing section 102 deletes, from the performance deficiency value table 145, information of the target setting volume with the largest performance deficiency value. Then, the bandwidth managing section 102 sets a sacrifice flag for the target setting volume with the largest performance deficiency value to ON. In addition, the bandwidth managing section 102 registers the performance deficiency value of the selected target setting volume at the time point in the performance deficiency value table 145. Then, the bandwidth managing section 102 sets the sacrifice flag for the selected target setting volume to OFF. The target setting volume that has the largest performance deficiency value and for which the sacrifice flag has been set to ON is an example of the "volume to be excluded".

After that, the bandwidth managing section 102 schedules an increase in the bandwidth allocated to the selected target setting volume. In addition, the bandwidth managing section 102 schedules a reduction in the bandwidth allocated to the non-target setting volume included in the sharing volumes.

When the measured value of the response time of the selected target setting volume 232 at the time point is smaller than the target value, the bandwidth managing section 102 schedules a reduction in the bandwidth allocated to the selected target setting volume. Then, the bandwidth managing section 102 determines whether the sacrifice flag for the selected target setting volume indicates OFF. When the sacrifice flag indicates ON, the bandwidth managing section 102 terminates a process of adjusting a bandwidth.

When the sacrifice flag indicates OFF, the bandwidth managing section 102 schedules an increase in the bandwidth allocated to the non-target setting volume included in the sharing volumes.

The bandwidth managing section 102 executes the second selection to select the volume from among the sharing volumes and sets schedules for the adjustment of bandwidths after the second selection for all guaranteed and target setting volumes included in the sharing volumes.

The volumes 232 of which the response time is used as indices for the performance adjustment are described above.

The operation managing server 1 according to the first embodiment, however, may execute the same processes on the volumes 232 of which IOPS or throughput is used as indices for the performance adjustment. For example, the operation managing server 1 calculates performance deficiency values from target and measured values of IOPS and throughput of selected target setting volumes, determines, based on the performance deficiency values of the target setting volumes, a target setting volume for which a sacrifice flag is to be set to ON, and adjusts a bandwidth.

Then, the bandwidth managing section 102 determines the adjustment of bandwidths allocated to the volumes 232 based on schedules for the adjustment to be executed on the volumes 232. For example, the bandwidth managing section 102 treats 0 as an initial value, adds 1 to the value for a schedule for an increase, subtracts 1 from the value for a schedule for a reduction, and calculates the sum of values for each of the volumes 232. When the result of the summing for a volume 232 is a positive value, the bandwidth managing section 102 determines an increase in a bandwidth allocated to the volume 232. When the result of the summing for the volume 232 is a negative value, the bandwidth managing section 102 determines a reduction in the bandwidth allocated to the volume 232.

After that, the bandwidth managing section 102 notifies the determined adjustment of the bandwidths allocated to the volumes 232 to the bandwidth control section 252. For example, the bandwidth managing section 102 transmits, to the storage device 2, setting commands to increase or reduce the bandwidths allocated to the volumes 232.

Functions of the guaranteed value setting section 101, the bandwidth managing section 102, and the monitoring section 103 are implemented by the CPU 13 illustrated in FIG. 2 and the memory 12 illustrated in FIG. 2, for example. For example, various programs for implementing the functions of the guaranteed value setting section 101, the bandwidth managing section 102, and the monitoring section 103 are stored in the HDD 14. The CPU 13 reads the various programs from the HDD 14, loads processes for implementing the functions of the guaranteed value setting section 101, the bandwidth managing section 102, and the monitoring section 103 into the memory 12, and executes the processes.

Next, functions of the storage device 2 are described. The process executing section 253 receives, from the application executed in the business server 4, a request to read and write data from and to the volumes 232. Then, the process executing section 253 reads and writes the data from and to the volumes 232 in accordance with the request.

The performance information acquiring section 251 receives, from the monitoring section 103, an instruction to start to collect performance information. Then, the performance information acquiring section 251 periodically acquires performance information of the volumes 232 and transmits the performance information to the monitoring section 103. In addition, the performance information acquiring section 251 periodically acquires performance information of the resources and transmits the performance information to the monitoring section 103. FIG. 3 illustrates, as an example of the acquisition of the performance information of the resources, the acquisition of the performance information by the performance information acquiring section 251 from the RAID group 231 and the FC switch 51. Upon receiving an instruction to collect performance information of a specific volume 232 from the monitoring section 103, the performance information acquiring section 251 acquires performance information of the specific volume 232 at this time point and transmits the acquired performance information of the specific volume 232 to the monitoring section 103.

The bandwidth control section 252 receives, from the bandwidth managing section 102, the setting commands to increase or reduce the bandwidths. Then, the bandwidth control section 252 increases or reduces each of the bandwidths allocated to the volumes 232 specified in the setting commands in accordance with each of the setting commands.

Figure 8A:
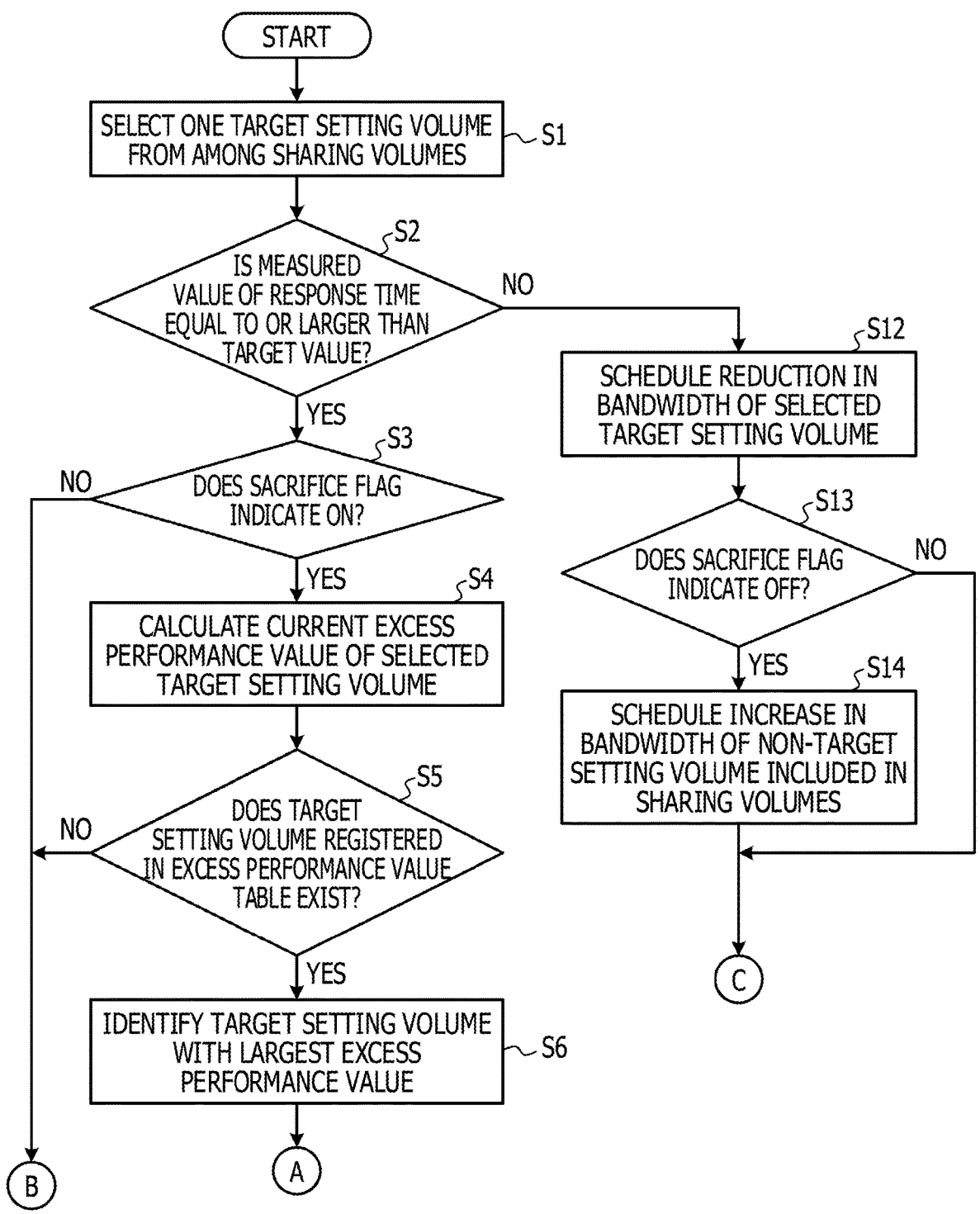
FIGS. 8A and 8B are a flowchart of a process of determining a schedule for bandwidth adjustment when a target setting volume is selected by the operation managing server according to a first embodiment.
Figure 8B:
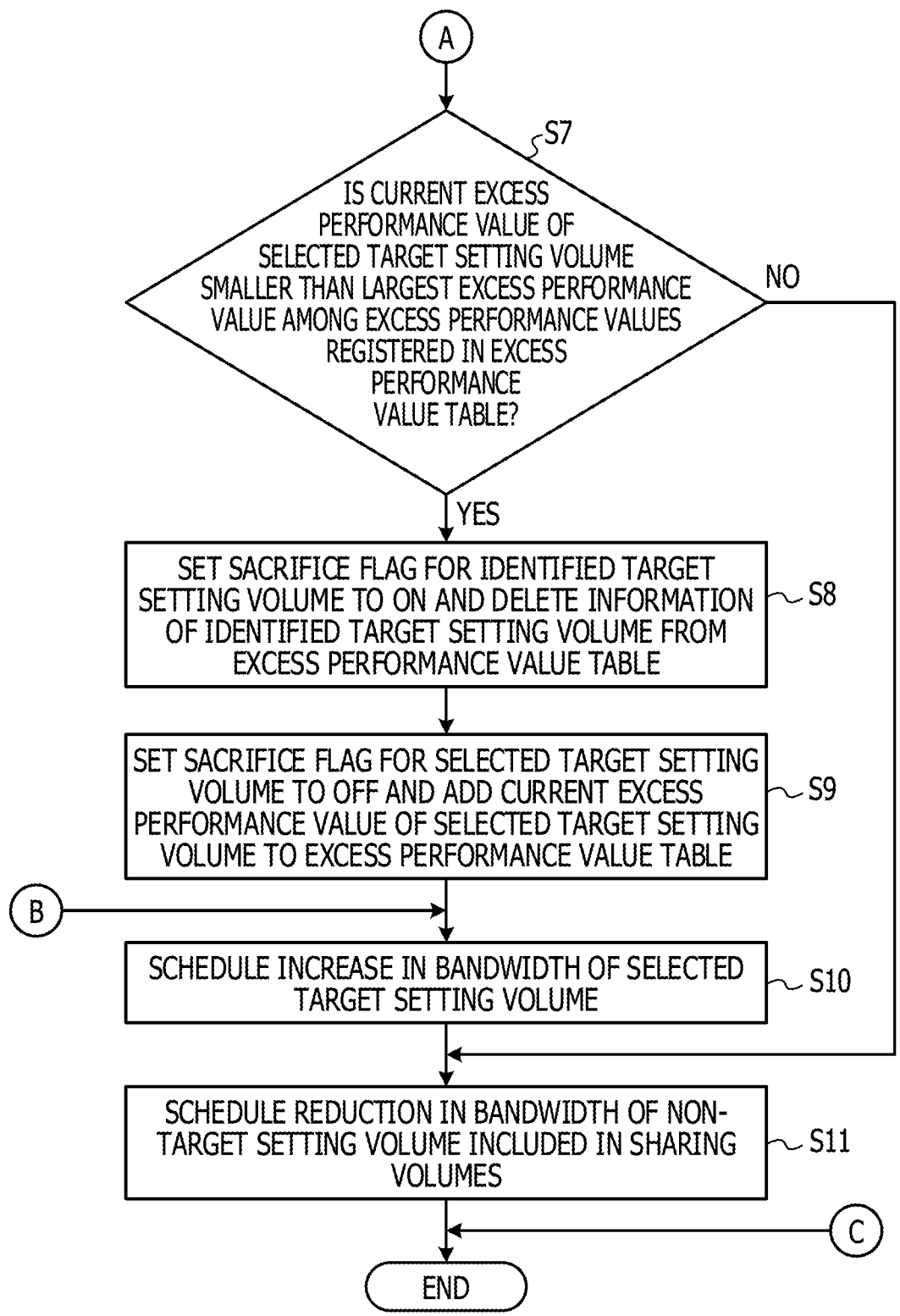

Next, the flow of a process of determining a schedule for bandwidth adjustment in the case where a target setting volume is selected by the operation managing server according to the first embodiment is described with reference to FIGS. 8A and 8B. FIGS. 8A and 8B are a flowchart of the process of determining the schedule for the bandwidth adjustment in the case where the target setting volume is selected by the operation managing server according to the first embodiment. The case where a target setting volume is selected in the second selection from among the sharing volumes is described below.

The bandwidth managing section 102 selects one target setting volume from among the sharing volumes (in step S1).

Next, the bandwidth managing section 102 requests the monitoring section 103 to measure a value of response time of the selected target setting volume at this time point. After that, the bandwidth managing section 102 acquires, from the monitoring section 103, the measured value of the response time of the selected target setting volume. Next, the bandwidth managing section 102 acquires, from the QoS setting table 141, a target value of the selected target setting volume. Then, the bandwidth managing section 102 determines whether the measured value of the response time of the selected target setting volume at the time point is equal to or larger than the target value (in step S2).

When the measured value of the response time of the selected target setting volume at the time point is equal to or larger than the target value (YES in step S2), the bandwidth managing section 102 determines whether a sacrifice flag for the selected target setting volume indicates ON (in step S3). When the sacrifice flag for the selected target setting volume indicates OFF (NO in step S3), the bandwidth managing section 102 causes the process to proceed to step S10.

When the sacrifice flag for the selected target setting volume indicates ON (YES in step S3), the bandwidth managing section 102 calculates a current performance deficiency value of the selected target setting volume from the measured value of the current response time and the target value (in step S4).

Next, the bandwidth managing section 102 determines whether a target setting volume registered in the performance deficiency value table 145 exists (in step S5). When the target setting volume registered in the performance deficiency value table 145 does not exist (NO in step S5), the bandwidth managing section 102 causes the process to proceed to step S10.

When the target setting volume registered in the performance deficiency value table 145 exists (YES in step S5), the bandwidth managing section 102 identifies a target setting volume with the largest performance deficiency value among performance deficiency values registered in the performance deficiency value table 145 (in step S6).

The bandwidth managing section 102 compares the current performance deficiency value of the selected target setting volume with the largest performance deficiency value among the performance deficiency values registered in the performance deficiency value table 145. Then, the bandwidth managing section 102 determines whether the current performance deficiency value of the selected target setting volume is smaller than the largest performance deficiency value among the performance deficiency values registered in the performance deficiency value table 145 (in step S7). When the current performance deficiency value of the selected target setting volume is equal to or larger than the largest performance deficiency value among the performance deficiency values registered in the performance deficiency value table 145 (NO in step S7), the bandwidth managing section 102 does not change the sacrifice flag, indicating ON, for the selected target setting volume and causes the process to proceed to step S11.

When the performance deficiency value of the selected target setting volume at the time point is smaller than the largest performance deficiency value among the performance deficiency values registered in the performance deficiency value table 145 (YES in step S7), the bandwidth managing section 102 sets a sacrifice flag for the target setting volume with the largest performance deficiency value to ON. The bandwidth managing section 102 deletes, from the performance deficiency value table 145, information of the target setting volume with the largest performance deficiency value (in step S8).

Next, the bandwidth managing section 102 sets the sacrifice flag for the selected target setting volume to OFF. In addition, the bandwidth managing section 102 registers the current performance deficiency value of the selected target setting volume in the performance deficiency value table 145 (in step S9).

After that, the bandwidth managing section 102 schedules an increase in a bandwidth allocated to the selected target setting volume (in step S10).

In addition, the bandwidth managing section 102 schedules a reduction in the bandwidth allocated to the non-target setting volume included in the sharing volumes (in step S11) and terminates the process of scheduling the bandwidth adjustment.

When the measured value of the response time of the selected target setting volume 232 at the time point is smaller than the target value (NO in step S2), the bandwidth managing section 102 schedules a reduction in the bandwidth allocated to the selected target setting volume (in step S12).

Then, the bandwidth managing section 102 determines whether the sacrifice flag for the selected target setting volume indicates OFF (in step S13). When the sacrifice flag indicates ON (NO in step S13), the bandwidth managing section 102 terminates the process of scheduling the bandwidth adjustment.

When the sacrifice flag indicates OFF (YES in step S13), the bandwidth managing section 102 schedules an increase in the bandwidth allocated to the non-target setting volume included in the sharing volumes (in step S14) and terminates the process of scheduling the bandwidth adjustment.

As described above, the operation managing server according to the first embodiment compares a performance deficiency value indicating how easy it is to reach a target value in the adjustment of performance of a target setting volume evaluated in the past with a performance deficiency value of a current target setting volume to be evaluated. Then, the operation managing server determines a target setting volume for which the achievement of a target value is abandoned and over which the adjustment of another volume is prioritized. Thus, while the achievement of a target value for a target setting volume for which it is difficult to achieve the target value is abandoned, a bandwidth allocated to a target setting volume for which it is easy to achieve a target value is adjusted to achieve the target value. In addition, the operation managing server may cause performance of a larger number of target setting volumes to reach target values of the target setting volumes. Thus, it may be possible to more efficiently adjust performance of volumes than the related techniques and improve the performance of the storage system.

In the above description, the target setting volume with the largest performance deficiency value is sacrificed. The operation managing server, however, may select another target setting volume as long as it is difficult for performance of the target setting volume to reach a target value. For example, performance deficiency values of target setting volumes with a predetermined number of largest performance deficiency values may be compared with performance deficiency values, obtained at this time point, of target setting volumes to be evaluated at this time point, and target setting volumes with a predetermined number of largest performance deficiency values may be treated as sacrificed volumes.

Next, a second embodiment is described. An operation managing server according to the second embodiment acquires, at the time of evaluation of a target setting volume selected in the second selection, a performance deficiency value of another target setting volume belonging to the sharing volumes at this time point and compares the acquired performance deficiency value with a performance deficiency value of the selected target setting volume. This feature is different from the first embodiment. The operation managing server according to the second embodiment is also illustrated in the block diagram of FIG. 3. In the following description, functions of the same units as those described in the first embodiment will not be described. A process of adjusting a bandwidth performed by the bandwidth managing section 102 after a target setting volume is selected in the second selection is described below.

When the volume 232 selected in the second selection is a target setting volume, the bandwidth managing section 102 requests the monitoring section 103 to measure a value of response time of the selected target setting volume. After that, the bandwidth managing section 102 acquires, from the monitoring section 103, the measured value of the response time of the selected target setting volume.

Next, the bandwidth managing section 102 acquires, from the QoS setting table 141, a target value of the selected target setting volume. When the measured value of the response time of the selected target setting volume at this time point is equal to or larger than the target value, the bandwidth managing section 102 determines whether a sacrifice flag for the selected target setting volume indicates ON.

When the sacrifice flag for the selected target setting volume indicates OFF, the bandwidth managing section 102 schedules an increase in a bandwidth allocated to the selected volume. After that, the bandwidth managing section 102 schedules a reduction in the bandwidth allocated to the non-target setting volume included in the sharing volumes. In addition, the bandwidth managing section 102 schedules an increase in the bandwidth allocated to the guaranteed volume selected in the first selection.

When the sacrifice flag for the selected target setting volume indicates ON, the bandwidth managing section 102 calculates a performance deficiency value of the selected target setting volume.

Next, the bandwidth managing section 102 requests the monitoring section 103 to measure values of response time of all target setting volumes included in the sharing volumes. After that, the bandwidth managing section 102 acquires, from the monitoring section 103, the measured values of the response time of all the target setting volumes included in the sharing volumes. In addition, the bandwidth managing section 102 acquires, from the QoS setting table 141, target values of all the target setting volumes included in the sharing volumes. Then, the bandwidth managing section 102 calculates performance deficiency values of all the target setting volumes included in the sharing volumes and registers the performance deficiency values in the performance deficiency value table 145.

Next, the bandwidth managing section 102 determines whether the performance deficiency value of the selected target setting volume is equal to the largest performance deficiency value among the performance deficiency values registered the performance deficiency value table 145.

When the performance deficiency value of the selected target setting volume at the time point is equal to the largest performance deficiency value among the performance deficiency values registered in the performance deficiency value table 145, the bandwidth managing section 102 does not change the sacrifice flag, indicating ON, for the selected target setting volume. After that, the bandwidth managing section 102 schedules a reduction in the bandwidth allocated to the non-target setting volume among the sharing volumes. In addition, the bandwidth managing section 102 schedules an increase in the bandwidth allocated to the guaranteed volume selected in the first selection.

When the performance deficiency value of the selected target setting volume is smaller than the largest performance deficiency value among the performance deficiency values registered in the performance deficiency value table 145, the bandwidth managing section 102 sets a sacrifice flag for the target setting volume with the largest performance deficiency value to ON. In addition, the bandwidth managing section 102 sets the sacrifice flag for the selected target setting volume to OFF.

After that, the bandwidth managing section 102 schedules an increase in the bandwidth allocated to the selected target setting volume. The bandwidth managing section 102 schedules a reduction in the bandwidth allocated to the non-target setting volume included in the sharing volumes.

When the measured value of the response time of the selected target setting volume 232 at the time point is smaller than the target value, the bandwidth managing section 102 schedules a reduction in the bandwidth allocated to the selected target setting volume. Then, the bandwidth managing section 102 determines whether the sacrifice flag for the selected target setting volume indicates OFF. When the sacrifice flag indicates ON, the bandwidth managing section 102 terminates the process of adjusting a bandwidth.

When the sacrifice flag indicates OFF, the bandwidth managing section 102 schedules an increase in the bandwidth allocated to the non-target setting volume included in the sharing volumes.

As described above, the operation managing server according to the second embodiment calculates the performance deficiency values of all the target setting volumes included in the sharing volumes upon the evaluation of the adjustment of bandwidths allocated to the target setting volumes. Then, the operation managing server determines, based on the calculated performance deficiency values, a target setting volume for which the achievement of a target value is abandoned and over which the adjustment of another volume is prioritized. Since information of performance deficiency of target setting volumes is used upon the evaluation of the adjustment of a bandwidth allocated to a target setting volume, it may be possible to accurately extract a target setting volume for which it is difficult for performance of the volume to reach a target value at this time point. Thus, it may be possible to efficiently adjust performance of volumes and improve the performance of the storage system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A bandwidth control device comprising:
   one or more memories including a plurality of storage regions associated with target values of performance of data transmission; and
   one or more processors coupled to the one or more memories and the one or more processors configured to acquire, for each of the plurality of storage regions, a measured value of performance of data transmission,
   perform, when a first measured value for a first storage region in the plurality of storage regions does not satisfy a first target value associated with the first storage region, selection of a second storage region from selection candidates including one or more storage regions determined from the plurality of storage regions based on differences between each of the target values and each the measured value, and reduce a bandwidth allocated to the selected second storage region,
   the selection is executed based on an amount of each of differences between each of the target values associated with the one or more storage regions and each the measured value for each of the one or more storage regions.

2. The bandwidth control device according to claim 1, wherein the one or more processors are further configured to adjust another bandwidth allocated to the first storage region such that the first measured value satisfies the first target value when the first storage region is not included in the selection candidates.

3. The bandwidth control device according to claim 1, wherein an amount of a difference between a second target value associated with the second storage region and a second measured value for the second storage region is the largest among amounts of the differences between each of the target values associated with the one or more storage regions and each the measured value for each of the one or more storage regions.

4. The bandwidth control device according to claim 1, wherein when the first storage region is included in the selection candidates, a first difference between the first measured value and the first target value is smaller than a second difference between a second measured value for the second storage region and a second target value associated with the second storage region.

5. The bandwidth control device according to claim 1, wherein the one or more processors are further configured to reduce a bandwidth allocated to the first storage region when the first measured value satisfies the first target value.

6. A bandwidth control method comprising:
  acquiring, for each of a plurality of storage regions, a measured value of performance of data transmission, the plurality of storage regions being associated with target values of performance of data transmission respectively;
  selecting, when a first measured value for a first storage region in the plurality of storage regions does not satisfy a first target value associated with the first storage region, a second storage region from selection candidates including one or more storage regions determined from the plurality of storage regions based on differences between each of the target values and each the measured value, and
  reducing a bandwidth allocated to the selected second storage region,
  the selection is executed based on an amount of each of differences between each of the target values associated with the one or more storage regions and each the measured value for each of the one or more storage regions.

7. The bandwidth control method according to claim 6, further comprising: adjusting another bandwidth allocated to the first storage region such that the first measured value satisfies the first target value when the first storage region is not included in the selection candidates.

8. The bandwidth control method according to claim 6, wherein an amount of a difference between a second target value associated with the second storage region and a second measured value for the second storage region is the largest among amounts of the differences between each of the target values associated with the one or more storage regions and each the measured value for each of the one or more storage regions.

9. The bandwidth control method according to claim 6, wherein when the first storage region is included in the selection candidates, a first difference between the first measured value and the first target value is smaller than a second difference between a second measured value for the second storage region and a second target value associated with the second storage region.

10. The bandwidth control method according to claim 6, further comprising: reducing a bandwidth allocated to the first storage region when the first measured value satisfies the first target value.

11. A non-transitory computer-readable medium storing instructions executable by one or more computers, the instructions comprising:
  one or more instructions for acquiring, for each of a plurality of storage regions, a measured value of performance of data transmission, the plurality of storage regions being associated with target values of performance of data transmission respectively;
  one or more instructions for selecting, when a first measured value for a first storage region in the plurality of storage regions does not satisfy a first target value associated with the first storage region, a second storage region from selection candidates including one or more storage regions determined from the plurality of storage regions based on differences between each of the target values and each the measured value, and
  one or more instructions for reducing a bandwidth allocated to the selected second storage region,
  the selection is executed based on an amount of each of differences between each of the target values associated with the one or more storage regions and each the measured value for each of the one or more storage regions.

* * * * *